United States Patent [19]

Wedlake

[11] Patent Number: 4,585,712
[45] Date of Patent: Apr. 29, 1986

[54] BATTERY COMPRISING HIGH TEMPERATURE RECHARGEABLE ELECTROCHEMICAL CELLS AND SUPPORT MEANS

[75] Inventor: Roger J. Wedlake, Johannesburg, South Africa

[73] Assignee: Lilliwyte Societe Anonyme, Luxembourg

[21] Appl. No.: 692,233

[22] Filed: Jan. 17, 1985

[30] Foreign Application Priority Data

Jan. 20, 1984 [ZA] South Africa ................ 84/0462
May 28, 1984 [ZA] South Africa ................ 84/4042

[51] Int. Cl.$^4$ .................................. H01M 10/50
[52] U.S. Cl. ............................ 429/50; 429/99; 429/120; 429/101
[58] Field of Search .............. 429/120, 112, 96, 99, 429/100, 50, 52, 102, 103, 101

[56] References Cited

U.S. PATENT DOCUMENTS

| | | | |
|---|---|---|---|
| 2,410,952 | 11/1946 | Lighton | 429/120 |
| 3,110,633 | 11/1963 | Bachmann | 429/120 X |
| 3,837,918 | 9/1974 | Nakabayashi | 429/120 X |
| 4,095,938 | 6/1978 | Mikaila | 429/120 X |
| 4,189,527 | 2/1980 | Stadwick et al. | 429/120 X |
| 4,329,407 | 5/1982 | Gross et al. | 429/101 |
| 4,332,866 | 6/1982 | Jacquelin et al. | 429/50 |
| 4,443,523 | 4/1984 | Hansenauer | 429/120 X |

FOREIGN PATENT DOCUMENTS

| | | |
|---|---|---|
| 0044753 | 1/1982 | European Pat. Off. |
| 2645261 | 4/1978 | Fed. Rep. of Germany |
| 2070975 | 9/1981 | United Kingdom |
| 2081000 | 2/1982 | United Kingdom |
| 2134698 | 8/1984 | United Kingdom |

OTHER PUBLICATIONS

J. Sudworth, "Construction & Testing of a Sodium Sulphur Vehicle Battery", (pp. 7-1 to 7-16)—Electrical Power Research Institute, Oct. 1983.
Feldman et al., "The Heat Pipe"—Mechanical Engineering, Feb. 1967 (pp. 30-33).
Kirk-Othmer Encyclopedia of Chemical Technology, pp. 191-201, vol. 12.

Primary Examiner—Anthony Skapars
Attorney, Agent, or Firm—Arnold, White & Durkee

[57] ABSTRACT

A battery of interconnected high-temperature rechargeable electrochemical cells, a method of operating the battery and support means for supporting and heating the battery are provided. The support means acts to carry the cells and to heat the cells from below. Heating the cells from below is electrical and/or by circulating heated gas through a plinth on which the cells rest, the gases being derived from the catalytic conversion of a hydrocarbon fuel.

4 Claims, 3 Drawing Figures

BATTERY COMPRISING HIGH TEMPERATURE RECHARGEABLE ELECTROCHEMICAL CELLS AND SUPPORT MEANS

This invention relates to a battery. In particular it relates to a battery comprising a plurality of interconnected high-temperature rechargeable electrochemical cells suitable for, but not restricted to, use as a power source for an electric vehicle; and to a method of operating such battery.

According to the invention a battery comprises a plurality of interconnected high-temperature rechargeable electrochemical cells and support means on which the cells rest for supporting and carrying the cells, the support means including heating means for heating the cells from below.

Cells of the type in question will typically have alkali metal-containing anodes, such as sodium anodes, and molten salt electrolytes such as sodium chloroaluminate electrolytes, the cells being operable in the temperature range of about 100°–500° C., and having normal operating temperatures in the range of about 150°–400° C. A battery of such cells can be arranged to maintain its normal operating temperature during charging and discharging thereof, by virtue of heat produced when a charge or discharge current flows across the internal resistance of the cell. However, when the battery is started from a cold condition, or is maintained in a substantially inoperative condition for some time, a heat source is needed to maintain the battery at or above its minimum operating temperature. This situation can frequently arise for example when the battery is used for electric vehicle propulsion, and the vehicle is stationary.

The support means may comprise a plinth on which the cells rest, the plinth being hollow to permit circulation of heating gases in the interior of the plinth. Thus, in accordance with the invention, the plinth has a load-bearing function to carry and locate and hold the cells together as a battery which can, for example, be loaded into or removed from an electric vehicle as a unit; and the plinth contributes to the thermal management of the battery by providing a heat source for the cells.

For electric vehicle use, the plinth should be as light and inexpensive as possible, while having the necessary load-bearing and heat supply properties. It is contemplated that a hollow, porous or honeycomb metallic construction for the plinth will supply it with these desired properties in combination, providing for ready heat conduction to the cells and for ready circulation of heated air or combustion gases in its interior, for an even temperature distribution across the plinth and to the cells.

The plinth may form the floor of an enclosure for the cells, the plinth including an electric heating element connected to the cells. The heating means may thus be electrical, and may indeed comprise several heating elements located in the plinth. The enclosure may be located within a housing for the battery such as a box with a lid. This box may have a load bearing outer skin of sheet material such as sheet metal, and it may comprise insulating material such as particulate insulating material, between said outer skin and an inner wall which surrounds a space for receiving the cells.

Instead of or in addition to the heating element, the heating means may comprise a catalyst for the flameless catalytic combustion of a hydrocarbon fuel. Thus, in one embodiment, the battery may include a heat pipe projecting from the exterior of the plinth into the interior thereof, the heat pipe leading from the plinth to a catalytic converter containing said catalyst for the flameless catalytic combustion of a hydrocarbon fuel, and the plinth having a fan in its interior for circulating heated air in the interior of the plinth. In this embodiment the plinth may form the floor of an enclosure as described above, and this enclosure may be located in the interior space of a housing containing insulating material as described above.

For an electric vehicle the housing or battery box may form an integral or unitary part of an electric vehicle, the battery box having a lid as described above to make provision for loading into or removal therefrom of the cells on their plinth. The housing or battery box may accordingly be of double-walled construction, having an inner wall spaced, e.g. by suitably distributed spacers, from an outer wall or skin, so that there is a thermally insulating air space therebetween to reduce heat loss between walls, optionally containing insulating material as described above, the outer wall conveniently forming part of the vehicle body. Additional insulating material, particulate or in the form of blocks, may be provided between the enclosure within which the cells are located, and the outer housing or box. Thermally insulating supports may be provided in the outer housing or box, for locating and supporting the cells on their plinth in position in the interior of the box, the supports acting to space said cells and plinth from the inner wall of the box.

In another embodiment of the invention, the inner wall of the housing or box may be in the form of a hollow jacket defining the enclosure for the cells, the jacket including the plinth which forms the floor of the enclosure, and including walls around the cells. In this embodiment the hollow interior of the jacket may define a combustion chamber containing the aforesaid catalyst, which will typically be particulate or at least porous, the jacket having at least one inlet for fuel/air-/oxygen, and at least one outlet, spaced from the inlet or inlets, for combustion gases.

The catalyst may thus be contained in the hollow interior of the plinth, the plinth having an inlet for a hydrocarbon fuel and oxygen and an outlet, spaced from the inlet, for combustion gases, the cells and the plinth being optionally housed within an outer insulating housing as described above.

It is contemplated in this regard that the housing or box may be in the nature of a basin of tray, having an upwardly open inner space or cavity for the plinth and cells, and an upper lid, the jacket extending across and providing the floor and side walls of the cavity. In this embodiment, insulating support members may extend between the jacket and the outer skin of the housing or box, under the plinth.

Typically the space or cavity will be circular or preferably rectangular, e.g. square in plan view outline, and of even depth, to receive a plinth of corresponding shape on which the cells are carried. For this shape, the warmest cells or parts thereof will generally, taking conduction and convention into account, be at a central position at the tops of the cells; the coldest part or parts of the cells being generally along the periphery of the plinth, at the bottoms of the outer or peripheral cells. It will thus be desirable to supply more heat to the colder parts of the cells than to the warmer parts, and the invention thus contemplates an uneven distribution of catalyst in the jacket, e.g. more along the periphery of the plinth or floor of the jacket than elsewhere. The jacket will permit the flow of hydrocarbon fuel, air and combustion gases therethrough, and will contain porous catalyst, the interior of the jacket optionally once again being of porous or honeycomb metallic construction, the floor of the jacket acting as and forming the load-bearing plinth for supporting the cells and supplying heat thereto.

The invention extends to a method of operating a battery of interconnected high-temperature rechargeable electrochemical cells which comprises supporting the cells on support means which includes heating means, and using the heating means at least intermittently to heat the cells from below.

Supporting the cells may be on support means comprising a hollow plinth, heating the cells being by circulating heating gases in the interior of the plinth. Circulating heating gas in the interior of the plinth may be by feeding a hydrocarbon fuel and oxygen through an inlet into the interior of the plinth and into contact with a catalyst in the interior of the plinth to effect the flameless catalytic combustion of the fuel and to produce heated combustion gases which leave the plinth from an outlet spaced from the inlet.

Instead, circulating heating gas in the interior of the plinth may be by means of a fan in the interior of the plinth which circulates heated air in the interior of the plinth, the method including heating said air by means of a heat pipe projecting into the interior of the plinth and connecting the plinth to a catalytic converter containing a catalyst for the flameless catalytic conversion of a hydrocarbon fuel, a hydrocarbon fuel being fed into the catalytic converter to effect the combustion of said fuel and to provide heat which is transported via the heat pipe into the interior of the plinth.

In addition, heating the cells may include passing an electric current through an electric heating element located in the plinth and connected to the cells.

The invention extends further to support means for supporting and heating a battery comprising a plurality of interconnected high-temperature rechargeable electrochemical cells, the support means comprising a plinth for carrying the cells, the plinth being hollow to permit circulation of heating gases in the interior of the plinth, and including heating means for heating the cells from below.

The invention will now be described, by way of example, with reference to the accompanying diagrammatic drawings, in which.

Figure 1:
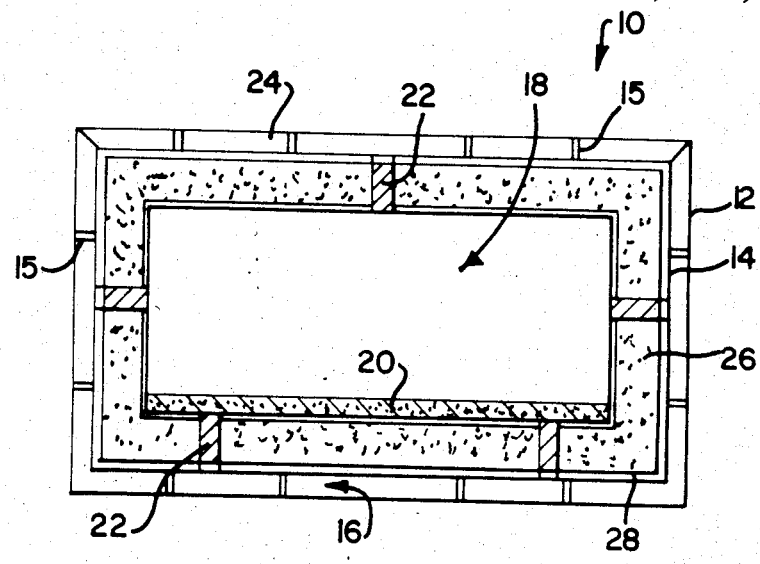
FIG. 1 shows a schematic cross-section in side elevation through the outer housing or battery box of a battery in accordance with the invention.
Figure 2:
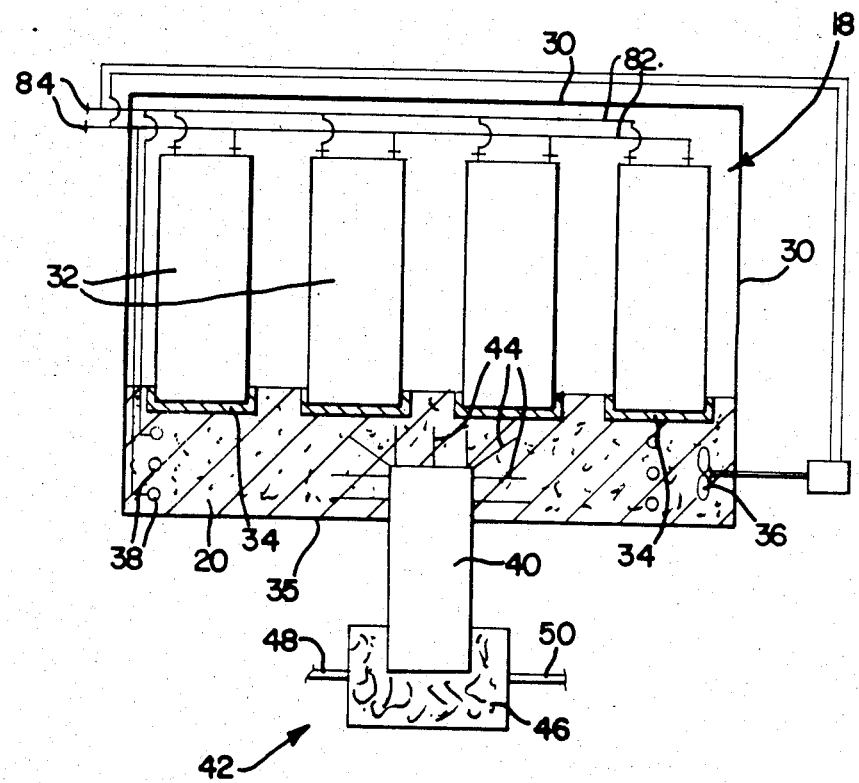
FIG. 2 shows on an enlarged scale a detail in similar cross-section to FIG. 1 of the cells and plinth of the battery of FIG. 1.

In FIG. 1 of the drawings, reference numeral 10 generally designates a housing or battery box forming part of a battery in accordance with the invention, the remainder of which battery is shown in FIG. 2. The box 10 of FIG. 1 is a battery housing for an electric vehicle in the form of a passenger sedan, the housing 10 being located in the position normally occupied by the boot or trunk of the vehicle. The box 10 is of double-walled construction, having an outer wall or skin 12 spaced from an inner wall 14 by spacers 15 to provide a thermally insulating air space 16 therebetween.

The battery further comprises a cell assemblage 18 (see also FIG. 2) mounted on a supporting plinth 20 in the box 10. The plinth 20 is spaced from the inner wall 14 of the housing 10 by thermally insulating load-bearing supports 22 which acts as spacers. The upper panels of the inner and outer walls 14, 12 combine to form an openable or removable lid 24 for the box 10 to provide for access to the cell assemblage 18 and plinth 20 eg by means of a crane, fork lift or the like. If desired, however, an access door may instead be provided in similar fashion for the same purpose, through a side wall of the housing or box 10.

The assemblage 18 and plinth 20 are surrounded in the interior of the box by a granular thermally insulating material 26. The material 26 is contained in several flexible bags or pockets 28 which can be packed around the assemblage 18 and its plinth 20, and between the supports 22, to isolate the assemblage 18 and plinth 20 thermally from the inner wall 14.

With reference to FIG. 2 the same reference numerals are used for the same parts, unless otherwise specified, the assemblage 18 and plinth 20 being shown in more detail on an enlarged scale. The assemblage 18 is shown within an enclosure 30 comprising side walls and a roof fast with the plinth 20 and containing a plurality of electrically connected high-temperature rechargeable electrochemical cells 32 each having its lower end or bottom resting in a correspondingly shaped recess in the upper surface of the plinth 18, each recess being lined with material 34 which is an electrical insulator but a good thermal conductor.

The interior of the plinth 20, enclosed by a skin 35 of similar material to the enclosure 30, is of a hollow, open, porous, metallic honeycomb construction, whereby air circulation through its volume is possible. A fan 36 for air circulation is provided in the interior or the plinth (which fan can be driven from the assemblage 18 as shown diagrammatically of from an external electricity supply) and the plinth 20 also has an electric heating element in the form of a heating coil 38 in its interior, also connected to the assemblage 18 as shown, or to an external electricity supply.

A heat pipe 40 is provided for conducting heat into the interior or the plinth from a heat source 42. The heat pipe has its one end in the interior of the plinth 20 provided with fins 44, and leads from the plinth 20 to the heat source 42 in which its opposite end is located, the heat source 42 being a catalytic converter containing a catalyst for the flameless catalytic combustion of a hydrocarbon fuel. This catalytic converter contains a palladium, platinum or the like catalyst 46 on a porous substrate, the converter having a fuel inlet 48 for a hydrocarbon fuel and air/oxygen, and a combustion gas outlet 50.

In use the electric vehicle in which the battery is mounted will have its propulsion provided by the cells 32 making up the assemblage 18. Propelling the vehicle will involve discharging the cells, which will be recharged from time to time. This recharging can be effected with the cells 32 in position in the box 10 as shown in FIG. 1 or the assemblage 18 on its plinth 20 can be physically removed from the box 10 for charging outside the vehicle. A new or recharged assemblage 18 of cells 32 on its plinth 20 being inserted in place of the discharged cells into the box 10.

Normally, during discharging of the cells 32 in use, or during charging thereof when they are located in the box 10, the current involved in said charging or discharging will, by virtue of the internal resistance of the cells 32, maintain them either at their intended operating temperature or at least above their minimum operating temperature so that subsequent normal use of the vehicle can raise the cells to their normal operating temperature. However, when the vehicle is stationary, particularly for long periods of time at low ambient temperatures, it is contemplated that some form of temperature maintenance will be required to keep the cells at their minimum operating temperature, and preferably at their normal operating temperature. This heating is, in accordance with the invention, provided via the plinth 20. When an external supply of electricity is available, heating when the vehicle is inoperative is preferably via the coil 38, the external electricity supply conveniently being used simultaneously to charge the cells 32, or at least to keep them topped-up.

However, when the vehicle is remote from an external electricity supply, the catalytic converter 42 and heat pipe 40 will be used, either to maintain the cells 32 above their minimum operating temperature, or, if necessary, to heat them up from a cold start, if the cells 32 have fallen in temperature down to the ambient temperature. Naturally, such complete cooling of the cells 32 will be discourage whenever possible, to avoid damage caused by stressing the cell components arising from any solidification of normally molten cell components. Use of the catalytic converter 42 with a platinum of palladium catalyst 46 will necessitate the use of a hydrocarbon fuel of high purity, with possible associated expense, but it is contemplated that, with proper management of the vehicle, use of the converter 42 may be necessary no more than a few times a year, so that the expense of its fuel would be trivial compared with the overall running expenses of the vehicle.

It is in principle possible to use electricity from the cells 32 themselves to maintain the temperature of the battery when the vehicle is stopped at a position remote from an external electricity supply, but such use of electricity from the cells 32 is wasteful, and naturally cannot be used to heat the battery from a cold start, when the cells are below their minimum operating temperature.

Whether the coil 38 or the heat pipe 40 is used to heat the porous hollow interior of the plinth 20, it is contemplated that the fan 36 will be used to circulate heated air throughout the interior of the plinth 20, to provide for an even distribution of heat to the various cells 32 via the material 34 in the recesses in which the cells are located. The fan can be driven from an external electricity supply, if available, or, if necessary, the fan can be driven by current from the cells 32 if they are above their minimum operating temperature.

In accordance with the invention the outer wall 12 of the box 10 of FIG. 1 will conveniently be part of the body, such as the trunk or boot, of the vehicle in question. In this embodiment the openable lid 24 can be similar to the ordinary openable lid of a vehicle trunk or boot. This construction (or similar access through the side of the box 10) makes possible, when desired, the complete replacement of the assemblage 18 and plinth 20 in a situation where the cells 32 require recharging, but where the time spent recharging is inconvenient, and a fully charged replacement assemblage 18 is available on its plinth 20. It is contemplated that the assemblage 18 on its plinth 20 will be removed from the box 10 by means of a suitable crane, fork lift or the like. In this regard it will be noted that the insulating material 26 in its bags or pockets 28, lends itself to simple, clean and easy removal thereof, during replacement of the assemblage on its plinth, and easy, quick and simple repacking thereof in position when the replacement assemblage has been inserted. This insulating material, together with the insulated supports 22 and air space 16, provides for an outer insulating housing for the cells and for efficient and effective temperature maintenance of the cells 32, with a minimum of heating necessary when the vehicle is stationary.

The box 10, as part of the vehicle, acts physically to assist the enclosure 30 in holding the cell assemblage in place, and provides a safety feature in the event of cell damage. Escaping cell contents are isolated from the remainder of the electric vehicle by the box, and the granular material 26 can be chosen to have sorbing properties, whereby it can act to sorb and hold captive escaping cell contents, for enhanced safety, bearing in mind the potentially hot, toxic and corrosive nature of escaping cell contents in high temperature cells of the type in question.

Having the box 10 integral with the vehicle body has the further advantage that the cell box is normally a dead weight which does not contribute electrochemically to cell operation in any way, but in accordance with the present invention it can form part of the vehicle body, acting mechanically to reinforce and strengthen the vehicle body and the chassis as a secondary function. In particular, location of the box at the position where the boot or trunk of a sedan is normally located, has the additional safety feature that, in general rear-end accidents to vehicles are less frequent, and as a rule, less destructive, than front-end accidents, and the cells with their contents are at a position where they are relatively isolated physically from the remainder of the interior of the vehicle.

Apart from reducing the overall weight and cost of the vehicle by having the box integral with the vehicle body, the air space provided by the box between the walls 12, 14 can be used as a housing for the fan mechanism, for the catalytic converter, and for various sensors, controls, electrical circuitry etc for the battery. This air space can also be used for cooling the battery, e.g. by providing flaps, louvres or the like, acting as air inlets and outlets to the air space, whereby admission and circulation of air through the air space can be controlled in response to movement of the vehicle to provide a desired degree of cooling. This cooling may optionally be supplemented by forced cooling from a fan located in the air space. If desired, insulating material such as granular insulating material may however instead be provided in this space, although it will be appreciated that in situations where maintaining temperature is not a serious problem, the box may at least in part have a single (as opposed to double) wall. It should also be noted that the openable lid of the box can provide for easy and direct access by electric power leads, e.g. from an external electricity supply, and the feature of the plinth provides for effective support of the cells 32 and assist in thermal management and heating thereof. Use of the honeycomb structure provides for both strength and air circulation, and acts positively to support and locate the cells 32 in position in the box 10.

Figure 3:
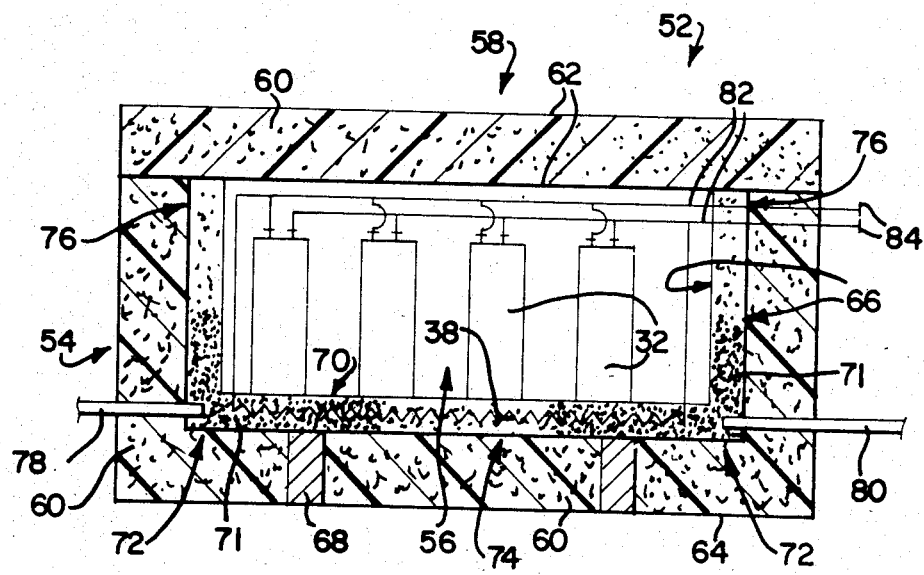
FIG. 3 shows a schematic cross-section in side elevation through another battery in accordance with the invention.

In FIG. 3 reference numeral 52 generally designates another battery of high temperature electrochemical cells 32 in accordance with the invention. The battery 52 is again suitable, for example, for electric vehicle use and is intended to be contained in a vehicle boot or trunk. The battery 52 comprises a battery box 54 which is rectangular in plan view outline and has an upwardly opening inner cavity 56 for the cells 32 and an upper lid 58. The box 54 and lid 58 are hollow and contain granular insulating material 60, e.g. a zeolite or similar tectosilicate suitable for sorbing, for safety purposes, leaking battery contents in the event of an accident or similar damage. The lid is of double walled construction having sheet metal inner and outer skins 62, and the box 54 similarly has an outer sheet metal skin 64.

The inner wall of the box 54 in in the form of a metal-walled, sealed hollow jacket 66 of porous metallic honeycomb internal construction for added strength. The jacket 66 is supported on the floor of the box 12 by insulating material 60 under the floor of the jacket 66 and by several spaced support members 68 of insulating material.

The jacket 66 has a floor 70 which acts as a plinth for supporting the cells 32, and acts as heating means for heating them from below. The honeycomb construction of said floor permits the circulation of heating gases through the interior of the floor and walls of the jacket 66.

The jacket 66 contains a particulate catalyst 71 for the flameless catalytic combustion of a hydrocarbon fuel. The catalyst 71 is unevenly distributed in the jacket 66, being most concentrated at 72, along the periphery of the floor or plinth of the jacket, in the floor and side walls of the jacket 66 at the corners between said side walls and floor. The concentration of catalyst decreases progressively over the plinth or floor of the jacket to a minimum at 74 at the middle or central part of the plinth, and to another minimum at 76 at the upper edges of the walls of the jacket. Concentration of the catalyst can be varied in any suitable way, e.g. by appropriately diluting it with inert material where its concentration is intended to be reduced.

The jacket 66 is shown with an inlet 78 for air and fuel and an outlet 80 spaced from the inlet 78. If necessary baffles can be provided in the interior of the jacket 66 to cause a flow of fuel, air and/or combustion gases throughout the interior of the jacket 66 along various flow paths from the inlet 78 to the outlet 80 which avoids the occurance of dead spots in the jacket where no flow or combustion takes place, and to encourage plug or series flow of gases throughout the interior or the jacket.

In use the cells 32 are connected together into a battery assemblage having substantially the same shape as the cavity 56, said battery assemblage occupying the cavity. In use, the cells will in general require no heating, and may even require cooling which can be effected by forcing air through the jacket. However, at start-up or during or after periods when the battery has not been in use, the cells can require heating up to their minimum operating temperature. Most heating will be required at the coldest surface zones of the cell assemblage, i.e. at the lowermost peripheral corners of the cavity 56, and the least heating will be required at the warmest zone of the cell assemblage, at the central top part thereof.

In use, heating the battery 52 is effected by introducing air (oxygen) and hydrocarbon fuel into the jacket 66 via the inlet 78. Flameless catalytic combustion of the fuel takes place in the jacket on the surface of the catalyst, to provide the battery with heat at a relatively low temperature (150° C. to 450° C.). The distribution of the catalyst, the fashion in which it is packed in the jacket, the use of baffles etc., are selected so that heat production in the various parts of the jacket is at least roughly proportional to catalyst concentration, the maximum heat production being at 72, and decreasing progressively through the interior of the jacket to the minima at the positions at 74 and 76.

As in the case of FIGS. 1 and 2, the battery 52 of FIG. 3 has a plinth on which the cells 32 are mounted, said cells and plinth being housed within an outer insulating housing. The plinth is hollow and has an inlet for hydrocarbon fuel and oxygen and an outlet spaced from the inlet for combustion gases. Feeding of fuel and oxygen (air) in through the inlet 78 acts, in conjunction with the baffles to cause circulation of heated gases through the interior of the plinth, to the outlet 80.

In the cells of FIGS. 1 and 2 and also of FIG. 3 operation of the battery in each case involves supporting the cells on support means, the support means including heating means, and the heating means being used at least intermittently to heat the cells from below. Heating gases are circulated through the hollow plinth, either by the fan which circulate hot air hated by the heat pipe of FIGS. 1 and 2, or merely by movement of gases during combustion thereof, from the inlet to the outlet in the case of FIG. 3. When required, electrical heating can also be used intermittently, particularly when an external electricity supply is available. In this regard it will be noted that the battery 52 of FIG. 3 has an electrical heating element 38, similar to the coil 38 of FIG. 2, located in the plinth forming the floor of the jacket 66, and the cells 32 in each case are interconnected by electrical leads 82 which leads 82 are connected to the heating element 38 and which also lead to external battery terminals 84.

As in the case of FIGS. 1 and 2, it is an advantage of the battery of FIG. 3 for electric vehicle use that it provides, clean and inexpensive heating of a high temperature battery. Safe low temperature heating is provided with clean exhaust gases. Because of the insulation provided it is expected that, in normal use, heating at a location where electric heating is unavailable will only occasionally be needed, but when it is needed, it will be essential for successful vehicle and battery use. For occasional use the store of fuel required need not be substantial and should not provide a volume or storage problem.

I claim:

1. A battery comprising a plurality of interconnected high-temperature rechargeable electrochemical cells and support means on which the cells rest for supporting and carrying the cells, the support means including heating means for heating the cells from below and the support means comprising a plinth on which the cells rest, the plinth being hollow to permit circulation of heating gases in the interior of the plinth, the heating means comprising a catalyst for the flameless catalytic combustion of a hydrocarbon fuel and the battery including a heat pipe projecting from the exterior of the plinth into the interior thereof, the heat pipe leading from the plinth to a catalytic converter containing said catalyst for the flameless catalytic combustion of a hydrocarbon fuel, and the plinth having a fan in its interior for circulating heated air in the interior of the plinth.

2. A battery comprising a plurality of interconnected high-temperature rechargeable electrochemical cells and support means on which the cells rest for supporting and carrying the cells, the support means including heating means for heating the cells from below and the support means comprising a plinth on which the cells rest, the plinth being hollow to permit circulation of heating gases in the interior of the plinth, the heating means comprising a catalyst for the flameless catalytic combustion of a hydrocarbon fuel, the catalyst being contained in the interior of the plinth, and the plinth having an inlet for a hydrocarbon fuel and oxygen, and an outlet spaced from the inlet, for combustion gases.

3. A method of operating a battery of interconnected high-temperature rechargeable electrochemical cells which comprises supporting the cells on support means which includes heating means and using the heating means at least intermittently to heat the cells from below, the supporting of the cells being on support means comprising a hollow plinth and the heating of the cells being by circulating heating gases in the interior of the plinth by feeding a hydrocarbon fuel and oxygen through an inlet into the interior of the plinth and into contact with a catalyst in the interior of the plinth to effect the flameless catalytic combustion of the fuel and to produce heated combustion gases which leave the plinth from an outlet spaced from the inlet means.

4. A method of operating a battery of interconnected high-temperature rechargeable electrochemical cells which comprises supporting the cells on support means which includes heating means and using the heating means at least intermittently to heat the cells from below, the supporting of the cells being on support means comprising a hollow plinth and the heating of the cells being by circulating heating gases in the interior of the plinth by means of a fan in the interior of the plinth which circulates heated air in the interior of the plinth, the method including heating said air by means of a heat pipe projecting into the interior of the plinth and connecting the plinth to a catalytic converter containing a catalyst for the flameless catalytic conversion of a hydrocarbon fuel, a hydrocarbon fuel being fed into the catalytic converter to effect the combustion of said fuel and to provide heat which is transported via the heat pipe into the interior of the plinth.

* * * * *